(12) United States Patent
Henning et al.

(10) Patent No.: US 11,492,791 B2
(45) Date of Patent: Nov. 8, 2022

(54) DOSING SYSTEM AND METHOD FOR DISPENSING AT LEAST ONE CHEMICAL COMPOSITION INSIDE THE TANK OF A TOILET

(71) Applicant: Henkel AG & Co. KGaA, Duesseldorf (DE)

(72) Inventors: Ingomar Henning, Nuembrecht (DE); Sascha Schaefer, Mettmann (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 175 days.

(21) Appl. No.: 16/878,218

(22) Filed: May 19, 2020

(65) Prior Publication Data

US 2020/0392712 A1 Dec. 17, 2020

(30) Foreign Application Priority Data

Jun. 13, 2019 (EP) .................................... 19180065

(51) Int. Cl.
*E03D 9/03* (2006.01)

(52) U.S. Cl.
CPC .................... *E03D 9/037* (2013.01)

(58) Field of Classification Search
CPC ......... E03D 9/037; E03D 9/032; E03D 9/005; E03D 9/08; E03D 9/033
USPC .......................................................... 222/1
See application file for complete search history.

(56) References Cited

U.S. PATENT DOCUMENTS

| 5,778,459 A * | 7/1998 | Guerin | E03D 9/02 4/225.1 |
|---|---|---|---|
| 5,881,396 A | 3/1999 | Rivera | |
| 2009/0211003 A1* | 8/2009 | Harris | E03D 1/01 222/394 |
| 2010/0205728 A1* | 8/2010 | Muhlhausen | E03D 9/005 4/223 |
| 2010/0243754 A1* | 9/2010 | Harris | A61L 9/14 239/34 |
| 2012/0317709 A1* | 12/2012 | Oates | E03D 5/105 4/313 |
| 2017/0058500 A1* | 3/2017 | Garrels | E03D 9/031 |
| 2018/0087254 A1* | 3/2018 | Lloyd | B65D 83/759 |
| 2018/0216331 A1* | 8/2018 | Ku | A61L 2/035 |

(Continued)

FOREIGN PATENT DOCUMENTS

| DE | 10330323 A1 | 1/2005 |
|---|---|---|
| DE | 102016225842 A1 | 6/2018 |
| WO | 2009105417 A1 | 8/2009 |

*Primary Examiner* — Benjamin R Shaw
(74) *Attorney, Agent, or Firm* — Lorenz & Kopf, LLP

(57) ABSTRACT

A dosing system and method for dispensing a chemical composition into a tank of a toilet. The system includes a sensor obtaining a parameter representative of an environment of the toilet. The dosing system further includes a non-transitory control unit receiving the parameter and generating an activation signal for triggering dispensing of an amount of the chemical composition into the tank based on the parameter. The system further includes a dosing device inserted inside the tank. The dosing device has a cavity containing the chemical composition and a dispensing mechanism coupled with the cavity. The dispensing mechanism receives the activation signal and dispenses the amount of chemical composition into the tank upon reception of the at least one activation signal.

12 Claims, 3 Drawing Sheets

(56) References Cited

U.S. PATENT DOCUMENTS

| | | | |
|---|---|---|---|
| 2018/0223517 A1* | 8/2018 | Wood | F21S 9/02 |
| 2019/0063054 A1 | 2/2019 | Luettgen et al. | |
| 2019/0360188 A1* | 11/2019 | Moshe | E03D 9/038 |
| 2020/0123754 A1* | 4/2020 | Kessler | E03D 5/105 |

* cited by examiner

DOSING SYSTEM AND METHOD FOR DISPENSING AT LEAST ONE CHEMICAL COMPOSITION INSIDE THE TANK OF A TOILET

CROSS-REFERENCE TO RELATED APPLICATION

This application claims priority to European Patent Application No. EP19180065, filed Jun. 13, 2019, which is incorporated herein by reference in its entirety.

TECHNICAL FIELD

The present disclosure relates to the field of dosing devices dispensing chemical compositions such as cleaning agents, fragrances or coloring agents inside the tank of a toilet. The present disclosure further concerns systems and methods for adapting the dispensing of chemical compositions inside the tank of a toilet.

BACKGROUND

Toilets require a certain degree of maintenance to remain clean and/or to avoid deposits of limestone or formation of biological films that could be detrimental to both the cleanliness of the toilet as to its operation.

In order to regularly dispense some cleaning agents for the maintenance and sanitation of toilets, it is now widespread to use rim blocks that contain one or more cleaning agents and further optionally including dyes and/or fragrances. These rim blocks are fixed on a rim of the toilet and contact the inner surface of the toilet bowl, so that they can dispense their chemistry when the toilet is flushed, via the interaction of water from the tank of the toilet with the rim block, on the toilet bowl.

Although such systems are successful at dispensing a cleaning agent regularly, immediately after a person interacted with the toilet by using it, they only act locally, downstream from a portion of a toilet bowl.

Besides, these rim blocks always dispense the same amount of cleaning agent, regardless of the actual requirements in order to keep the toilet clean. Frequency of flushing is the only parameter that provides some control over the amount of cleaning agent dispensed.

In order to provide a better control over the amount of cleaning agent that is dispensed, document DE 102016225842 A1 describes a smart toilet rim block that includes sensor technology to assess a current cleanliness state of the toilet and to adapt the amount of cleaning agent that is dispensed as the toilet is flushed.

This system is however designed to act at the same level as any other rim block, downstream from a portion of the toilet bowl, leaving other areas of the toilet and parts of the toilet bowl dirty.

Another approach consists in putting a cleaning agent dispensing device inside the tank of a toilet. One possibility is to put a solid block of cleaning agent that will progressively dissolve in the water of the tank and act simultaneously on the water inside the tank and on a larger portion of the toilet bowl than a rim block when the toilet is flushed. Solid blocks of cleaning agent that dissolve in the water of the tank do not however allow a control over the amount of cleaning agent that is dispensed, and need to be replaced frequently. This is not convenient, in particular for toilets with a tank that is built inside the wall of a room.

Document DE 10330323 A1 describes a dosing device for dispensing a cleaning agent into the water of a tank of a toilet. The dosing device is placed inside the tank of the toilet and includes a dispensing mechanism that can selectively dose the dispensing of a cleaning agent. The device of this document is however fixed to a wall of the tank, and doses the dispensing of a cleaning agent according to a predetermined program.

For the above reasons, a system and method for dispensing a cleaning agent in a toilet that enables an improved control of the dispensing of a chemical composition is sought.

SUMMARY

To address the above need, the present disclosure provides a dosing system for dispensing at least one chemical composition into a tank of a toilet in accordance with an exemplary embodiment. The dosing system includes:
  at least one sensor configured to obtain a parameter representative of a current state of an environment of the toilet;
  a non-transitory control unit capable of receiving the measured parameter and configured to generate at least one activation signal for triggering dispensing of an amount of the at least one chemical composition into the tank of the toilet based at least in part on the obtained parameter;
  a dosing device, configured to be inserted inside the tank of the toilet, the dosing device including:
  at least one cavity containing the at least one chemical composition,
  a dispensing mechanism coupled with the at least one cavity, the dispensing mechanism being configured to receive the at least one activation signal from the non-transitory control unit and to dispense the amount of the at least one chemical composition into the tank of the toilet upon reception of the at least one activation signal.

Such a dosing system activates the dispensing of one or more chemical compositions based not only on possible prerecorded programs for dosing the chemical composition, but also by taking into account recent information provided by sensors. Consequently, the dosing of the chemical composition can be adjusted in the amount that is output and the timing of the output can occur in a more relevant way. In particular, the activation signal can trigger the dispensing of a chemical composition after the tank is refilled with water, prior to flushing the toilet or during a flushing operation. Each of these steps of the use of a toilet can be accurately identified by analyzing information received from sensors. By dispensing the chemical composition directly into the tank of a toilet, cleanliness and maintenance is more efficiently achieved upstream and downstream from the toilet bowl.

According to an embodiment, at least one of the non-transitory control unit and the at least one sensor may be an integral part of the dosing device.

A dosing system which includes the non-transitory control unit and at least one sensor is more compact and easier to handle. However, more sensors can be arranged on other parts of the toilet to further enhance the dosing system.

According to an embodiment, the at least one sensor may be at least one of:
  a vibration sensor configured to identify vibration patterns associated with an interaction with the toilet, an acoustic sensor configured to identify noise patterns associated with an interaction with the toilet, a temperature sensor, a chemical gas sensor configured to identify molecules associated with undesired scent, a liquid turbidity sensor configured to measure properties of water inside the tank of the toilet, a pressure sensor configured to detect usage of the toilet by a person sitting on a seat of the toilet, a water level sensor configured to detect flushing of the toilet, an optical sensor configured to detect changes in light intensity cast on the toilet characteristic of a person being present within a predetermined distance from the toilet, a biosensor configured to detect presence of biological material in water in the tank of the toilet.

According to an embodiment, the parameter representative of a current state of an environment of the toilet may be at least one of:

a vibration pattern associated with an interaction with the toilet;

a noise pattern associated with an interaction with the toilet;

presence of a molecule associated with an undesired scent;

water hardness of water inside the tank of the toilet;

intensity of light cast on the toilet;

mechanical pressure exerted on the toilet by a person sitting on the toilet, water level inside the tank of the toilet;

presence of bacteriological material in water inside the tank of the toilet.

According to an embodiment, the non-transitory control unit may be configured to exchange data with a mobile device, data received from the mobile device providing the non-transitory control unit with a program including at least one activation signal for triggering and setting the duration of dispensing of the at least one chemical composition into the tank of the toilet.

Pre-programmed default settings can be accessed by the non-transitory control unit and used to generate activation signals to use the dosing device. Such pre-programmed settings can for example be accessed via a network from a remote database or be input and parameterized by a user.

According to an embodiment, the non-transitory control unit may be configured to exchange data with a mobile device, data received from the mobile device providing the non-transitory control unit with a program including a set of rules associating values of the parameter representative of the current state of the environment of the toilet with properties of activation signals for triggering and setting the duration of dispensing of amounts of the at least one chemical composition into the tank of the toilet.

The set of rules can be parameterized for example by a user via the mobile device, which can be a mobile phone, a computer, a tablet a server or any other device enabling a user and a machine to exchange information. Such devices are typically called "man-machine interface". The set of rules can also be accessed via a network or be based on a previous recording of usage of the toilet. In particular a self-learning algorithm can be included in the mobile device or the non-transitory control unit in order to adapt the dispensing strategy based on previous usage of the dosing device in the tank of the toilet and based on feedback obtained from users of the device on the same toilet or on different toilets equipped with a similar dosing system.

According to an embodiment, the at least one chemical composition may be chosen from among:

a descaling agent;

an antibacterial agent;

a cleaning agent including enzymes;

a cleaning agent including surfactants;

a cleaning agent including polymers;

a cleaning agent including a foam-forming substance;

a coloring agent; and a fragrance.

According to an embodiment, the dosing device may be configured to float on a surface of water contained inside the tank of the toilet.

In order to enable the dosing device to float on the surface of the water inside the tank of the toilet, a floater may be arranged on the dosing device.

According to an embodiment, the dosing device may include at least two cavities, each cavity being filled with a different chemical compound, each cavity being chosen from at least one among a refillable cartridge and a replaceable cartridge.

More than one cavity, and in particular any number of cavities can be arranged on the dosing device. These cavities can for example be in the form of cartridges or any other similar device. The cartridges can further be replaceable or refillable for example.

The present disclosure also pertains to a method for dispensing at least one chemical composition inside the tank of a toilet, the method including:

obtaining a parameter representative of a current state of an environment of the toilet;

generating at least one activation signal for triggering dispensing of an amount of the at least one chemical composition into the tank of the toilet based at least in part on the obtained parameter;

sending the at least one activation signal to a dispensing mechanism of a dosing device, the at least one activation signal triggering a dispensing of the amount of the at least one chemical composition from a cavity of the dosing device into the tank of the toilet; and dispensing the amount of the at least one chemical composition.

According to an embodiment, the method may further include generating the at least one activation signal upon detecting at least one of the following parameters representative of the current state of the environment of the toilet:

interaction with a lid of the toilet;

interaction with a seat of the toilet;

a noise characteristic of a person using the toilet;

a vibration characteristic of the person using the toilet;

a reduction of water level in the tank of the toilet;

an increase of water level in the tank of the toilet;

activation of a flushing mechanism of the toilet;

an increase in light intensity cast on the toilet characteristic of a person moving away from the toilet;

a decrease in light intensity cast on the toilet characteristic of a switching off of light in a room in which the toilet is;

a noise characteristic of a door being opened and closed in a room in which the toilet is; and a vibration characteristic of a door being opened and closed in a room in which the toilet is.

According to an embodiment, the method may further include generating the at least one activation signal upon detecting at least one of the following parameters representative of the current state of the environment of the toilet:

lifting-up of a lid of the toilet;
increased pressure exerted on a seat of the toilet;
a noise characteristic of a person using the toilet; and
a vibration characteristic of the person using the toilet.

According to an embodiment, the method may further include generating the at least one activation signal upon detecting at least one of the following parameters representative of the current state of the environment of the toilet:
a reduction of water level in the tank of the toilet;
an increase of water level in the tank of the toilet;
activation of a flushing mechanism of the toilet;
decreased pressure exerted on a seat of the toilet; and
closing-down of a lid of the toilet.

According to an embodiment, the method may further include generating the at least one activation signal upon detecting at least one of the following parameters representative of the current state of the environment of the toilet:
an increase in light intensity cast on the toilet characteristic of a person moving away from the toilet;
a decrease in light intensity cast on the toilet characteristic of a switching off of light in a room in which the toilet is;
a noise characteristic of a door being opened and closed in a room in which the toilet is; and
a vibration characteristic of a door being opened and closed in a room in which the toilet is.

The first, second and third chemical compositions can be different or identical. The amounts released for each chemical composition can also be adjusted based on the information provided by the sensors and the parameters input for example by a user.

According to an embodiment, the at least one activation signal may include a series of signals triggering a dispensing of at least two different chemical compositions in a sequence.

For example, a shuffle program can change the coloring agent that is dispensed upon flushing the toilet to change the appearance of the toilet bowl and improve user experience. The sequence of coloring agents can be dispensed during one flushing of the toilet. It is also possible to dispense one coloring agent per flushing of the toilet, but a different one for each flushing of the toilet, according to a sequence. The sequence can be random or pre-programmed. Instead of a coloring agent, the same dispensing strategy can be used to dispense fragrances for example.

According to an embodiment, the method may further include:
determining that the at least one cavity of the dosing device includes an amount of the at least one chemical composition that is below a predetermined threshold;
generating and outputting a warning signal indicating properties of the at least one chemical composition and indicating that the at least one chemical composition is below the predetermined threshold.

The determination can typically result from a measurement provided by a sensor placed on the dosing device, or by the non-transitory control unit which can estimate the usage of the chemical composition by counting the amounts of chemical composition previously dispensed. The non-transitory control unit or the sensor can then generate a warning message that is for example output to a mobile device or stored in a memory on the non-transitory control unit that is accessible via a network.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
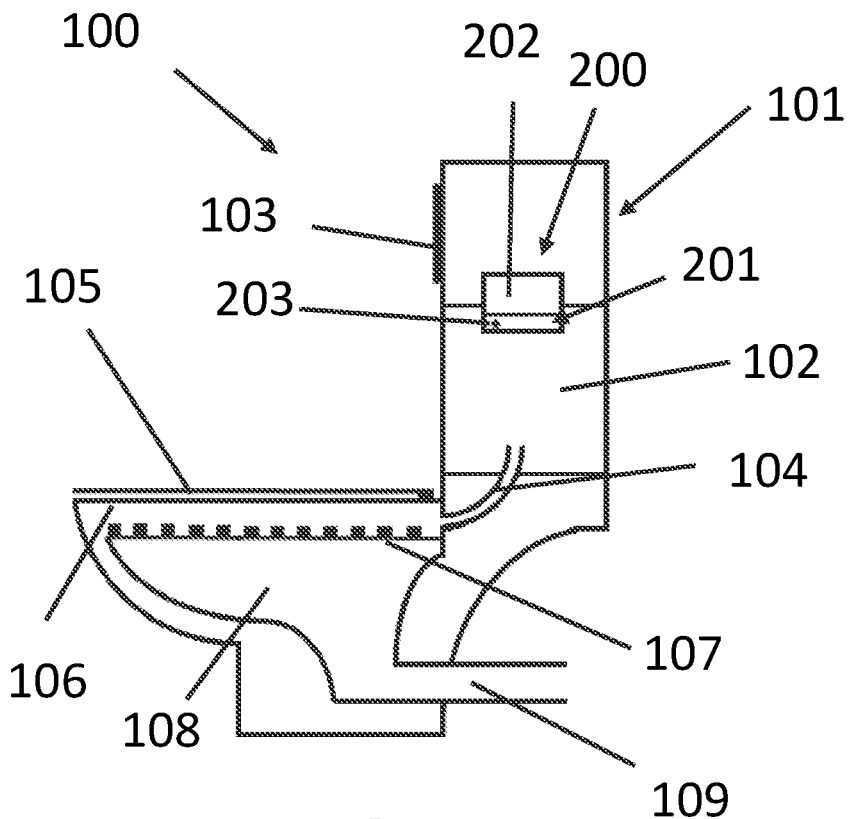
FIG. 1 shows a schematic representation of a toilet including a dosing system in which a dosing device is integral with a non-transitory control unit and a sensor.

A toilet 100 is a simple mechanical device which can take the form illustrated on FIG. 1. A toilet 100 typically includes a seat 106 closed by a lid 105, a bowl 108, a tank 101 filled with water 102 after each flushing operation and a button 103 or similar mechanism to activate flushing of the toilet. Water 102 from the tank 101 is directed towards the bowl 108 via a connection 104 typically in the form of a pipe opened with a valve or a similar mechanism upon pressing of the button 103. Water 102 then flows downwards the bowl 108 entering the area of the bowl 108 from openings 107 arranged in the upper part of the bowl 108 below the seat 106. A drain pipe 109, typically with a siphon, evacuates the contents of the bowl.

As can be seen on FIG. 1, water interacts with different parts of the toilet 100, from the inside of the tank 101 to the bowl 108. In order to insure proper maintenance of a toilet, it is therefore particularly advantageous to introduce any cleaning agents or fragrances not only in the bowl 108 but directly inside the tank 101 of the toilet 100.

The present disclosure provides a dosing device 200 that can interact with a non-transitory control unit 201, and a sensor 203. In the embodiment represented on FIG. 1, the dosing device 200, the sensor 203 and the non-transitory control unit 201 are all part of the same physical object. However, it is to be noted that only the dosing device 200 needs to be inside the tank 101 of the toilet 100. The non-transitory control unit 201 can be located outside of the tank 101 and outside of the toilet 100, for example be part of a server or a mobile device. The sensor 203 can be located anywhere on the dosing device 200, in the tank 101, on the toilet 100 or in the vicinity of the toilet 100, depending on the parameter that the sensor 203 measures. There can also be more than one sensor 203.

The dosing device 200, the sensor 203 and the non-transitory control unit 201 together form the dosing system that is an object of this present disclosure, they can interact in a wired or wireless fashion.

Figure 2:
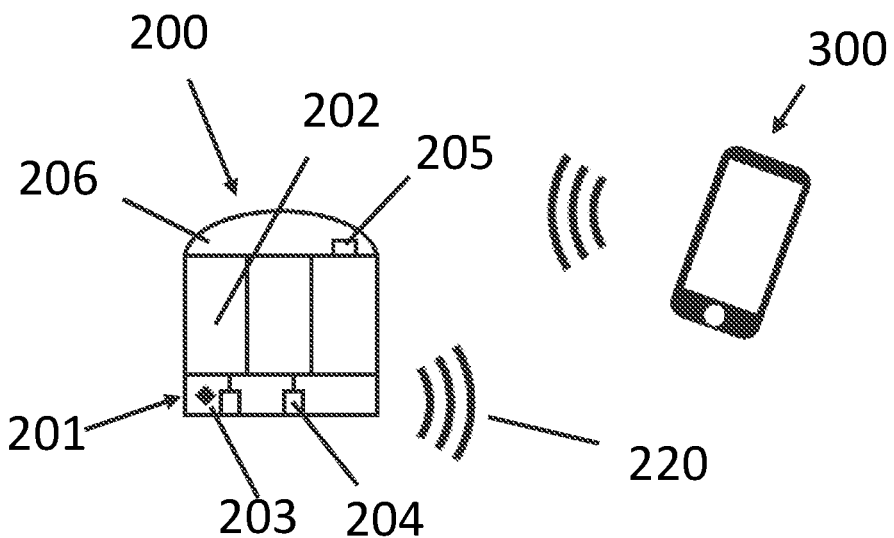
FIG. 2 shows a schematic representation of dosing system in which a dosing device is integral with a non-transitory control unit and a sensor, the dosing device interacting with a mobile device.

FIG. 2 illustrates in further detail one possible arrangement for the dosing system. The dosing system of FIG. 2 also represents a dosing device 200 that is integral with a non-transitory control unit 201 and a sensor 203. It is to be noted that these three elements can be separate from each other and exchange information wirelessly in order to enable a controlled dispensing of the chemical composition found in the dosing device 200 into the tank 101 of the toilet 100.

The dosing device 200 includes at least one cavity 202 that is represented as a cartridge on FIG. 2. The cavity 202 houses a chemical composition that can for example be either in liquid, gas or solid form. Solid chemical compositions can advantageously be in a powder or grain form that can then dissolve in the water 102 of the tank 101.

Among possible chemical compositions, it is advantageous to include one of the following in the cavity 202: a descaling agent, an antibacterial agent, a cleaning agent including enzymes, a cleaning agent including surfactants, a cleaning agent including a foam-forming substance, a cleaning agent including polymers, a coloring agent, a fragrance. As seen on FIG. 2, more than one cavity 202 can be present in the dosing device 200.

The dosing device 200 further includes a dispensing mechanism 204, 205. This dispensing mechanism can for example be in the form of a valve, activated electronically upon receiving an activation signal from the non-transitory control unit 201 for example. It can also be a spray system whose activation is also triggered by an activation signal received from the non-transitory control unit 201. The dispensing mechanism 204, 205 can also differ from a valve and can for example include a pump. In the case in which more than one cavity 202 is present in the dosing device 200, each cavity 202 can be activated by a different activation signal.

Optionally, the dosing device 200 can include a floater 206, that can be arranged on any part of the device. The floater ensures that the dosing device 200 remains only partially inside the water 102 of the tank 101. This can in particular be advantageous in the case in which a fragrance in gas form is to be dispensed inside the tank of the toilet 101.

The dosing device 200, the sensor 203 and the non-transitory control unit 201 can communicate with each other. In particular, the sensor 203 is capable of sending the parameters that it measures to the non-transitory control unit 201. The non-transitory control-unit can communicate with the dispensing mechanism 204, 205 by sending it an activation signal, that is generated at least based on the information provided by the sensor 203.

In the case in which the dispensing mechanism 204, 205 is a valve, the amount of chemical composition dispensed from the cavity 202 into the water 102 of the tank 101 depends on the duration of opening of the valve. The activation signal can be adapted in order to increase or decrease the time during which the valve is open in order to adapt the amount of chemical composition that is dispensed.

It is optionally possible to program the dispensing of the chemical composition by providing information input by a user. For that matter, the non-transitory control unit 201 or the sensor 203, or the dispensing mechanism 204, 205 or any combination of these three elements can establish a communication 220 with a mobile device 300. The mobile device 300 is a man machine interface that allows a user to force the dosing device 200 to dispense the chemical composition according to a predefined timing and logic. The interface can in particular be in the form of an "app" on the mobile device.

The information provided by the user to force dispensing of the chemical composition via the mobile device 300 can further be processed by the non-transitory control unit 201 by combining it with information provided by the sensor 203. In such a case, the non-transitory control unit 201 can enhance the instructions received from the mobile device 300 with a dosing strategy that takes into account the reality of the environment in the tank 101 of the toilet 100 or any other part of the toilet 100. The non-transitory control unit 201 can further send information back to the mobile device 300 in order to report the current status of the dosing strategy that is implemented to the user. The reports can further indicate a remaining amount of chemical composition in the cavity 202, provide information on the timing and amount dosed, as well as provide a processed report on the history of the environment of the toilet 100 as assessed based on the information obtained from the sensor 203.

A remaining amount of chemical composition in the cavity 202 can for example be determined from a measurement provided by a sensor placed on the dosing device, or by the non-transitory control unit which can estimate the usage of the chemical composition by counting the amounts of chemical composition previously dispensed. The non-transitory control unit or the sensor can then generate a warning message that is for example output to the mobile device 300 or stored in a memory on the non-transitory control unit that is accessible via a network.

It is to be noted that the mobile device 300 can also be replaced by any other user interface, such as for example an interface on or in communication with a computer, a server, a tablet for example.

Figure 3:
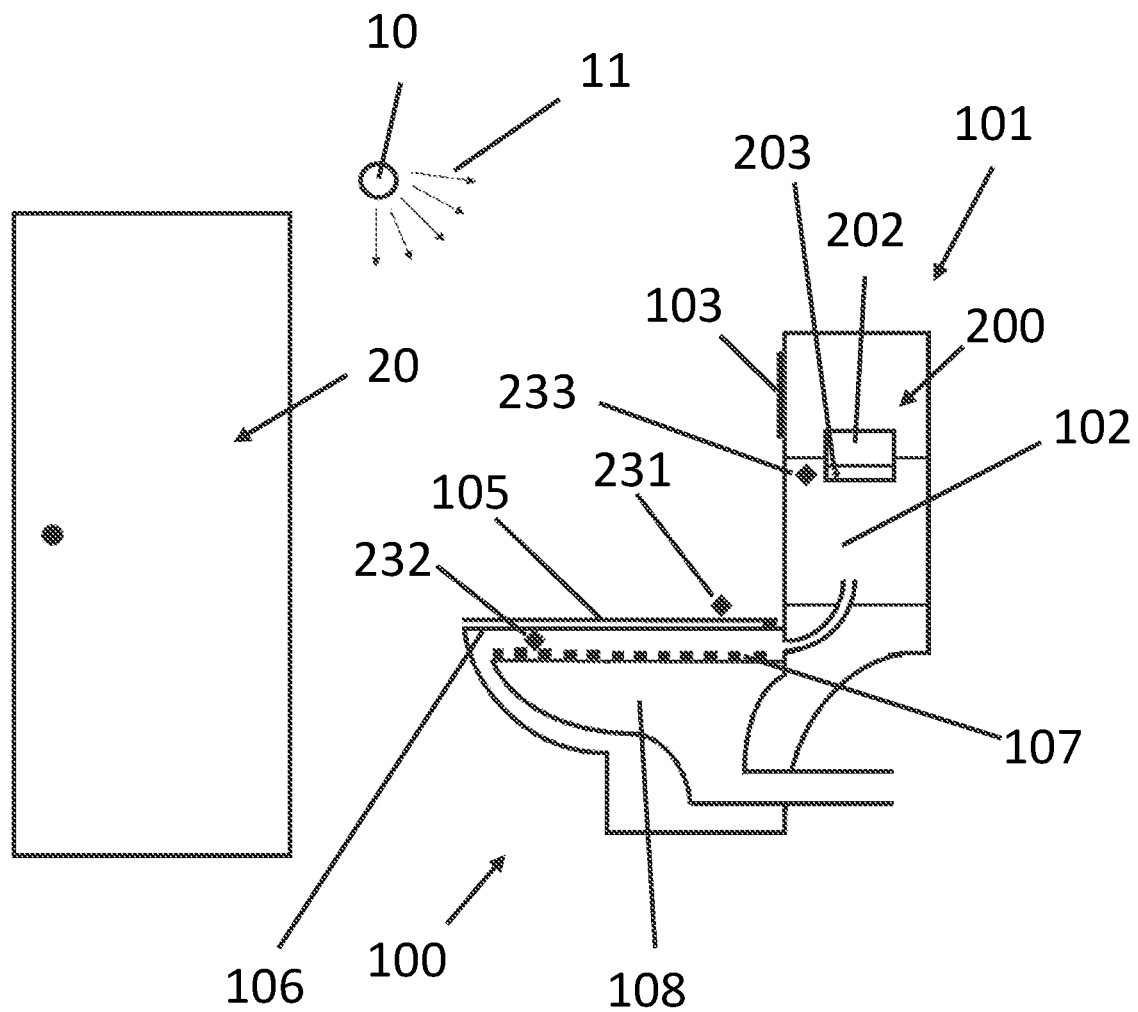
FIG. 3 shows a schematic representation of a toilet according to FIG. 1 in a room, further including additional sensors arranged on the toilet.

FIG. 3 shows another schematic representation of a toilet 100 in a room including a door 20 and a light source 10. Several sensors 231-233 are arranged at different locations on the toilet 100 in order to measure different parameters of the environment of the toilet 100.

These sensors can advantageously be units that either record a certain parameter over a certain period of time or are configured to react to changes in the environment of the toilet 100.

The sensors can for example be chosen from: a vibration sensor, such as an accelerometer, an acoustic sensor, such as a microphone, a chemical gas sensor, such as an electronic noise or a set of receptors reacting to specific chemicals, a biosensor, a turbidity sensor, such as for example a visible light or near infrared light source coupled with a detector of absorbed radiation, a pressure sensor, a water level sensor, a temperature sensor or an optical sensor.

A vibration sensor can be placed anywhere on the toilet 100, and even on the dosing device 200. It can typically record vibration patterns which can then be sent to the non-transitory control unit 201 to be interpreted, for example by comparing them to reference patterns stored in a database on the non-transitory control unit 201 or accessed remotely on another storage device. Reference patterns typically include stored recordings of vibrations induced by interactions with the toilet such as: vibrations measured when the toilet is flushed, vibrations measured when a person sits on the toilet, vibrations induced in the toilet bowl 108 during usage of the toilet, vibrations induced by opening and closing the door 20, vibrations induced by switching on or switching off the light source 10. The patterns are most accurate when they correspond to measurements made on the same toilet with the sensor placed in the same location. However, special features in the reference patterns are identical independently from the location of the sensor and can also be used to identify a match between an interaction with the toilet 100 and a reference pattern. Comparison between the measurements made by the vibration sensor and the reference patterns can take the form of a correlation of recorded signals for example, or the mere identification of special features in the evolution over time of the vibration.

Similarly to the above, the acoustic sensor can be placed anywhere on the toilet 100 or on the dosing device 200 and record the same patterns as those described above in connection with the vibration sensor.

A chemical gas sensor can typically be configured to identify specific molecules associated with an undesired scent. Upon detection of a concentration of such molecules that is above a warning threshold, the non-transitory control unit 201 may generate an activation signal aimed at releasing an amount of fragrance into the tank 101 of the toilet 100. The scent cancelling agent can be generic and adapted for all types of undesirable scents or target a specific type of scent.

The turbidity sensor can typically be configured to measure special properties of water 102 inside the tank 101 of the toilet, for example to detect a level of limestone concentration in the water 102 or biological agents capable of changing the optical properties of water. The turbidity sensor can be arranged anywhere in the water 102 of the tank 101, or on a wall of the tank 101, inside the water 102. It can also be part of the dosing device 200, for example by including a water inlet section on the dosing device 200 to apply simple spectroscopic measurements on a portion of the water 102 of the tank 101 passing through the water inlet.

A pressure sensor can advantageously be arranged on the seat 106 of the toilet 100, as illustrated with sensor 232 on FIG. 3. Such a sensor is advantageously placed under the opened oval-shaped seat 106 of the toilet 100 in order to react to the weight of a person sitting on the toilet. Based on the pressure that is exerted on the pressure sensor, the non-transitory control unit 201 can estimate whether the person sitting on the seat 106 of the toilet 100 is a child, an adult, a woman or a man should the weight of specific users of the toilet 100 be prerecorded and stored in a memory accessible to the non-transitory control unit 201, the latter can access this information to recognize the identity of the person sitting on the toilet 100 and adapt the dosing strategy to the needs or prerecorded wishes of that person.

Prerecorded wishes can for example be: a desired color of the water 102, a desired scent of the water 102, a desired amount of foam generated when flushing the toilet, a preset dosage of cleaning agent or a specific choice of cleaning agent.

The activation signal can also include a series of signals that trigger a dispensing of different chemical compositions, in particular different coloring agents and/or different fragrances according to a shuffle program. This can improve user experience by adding an element of surprise and changing the perceived environment of the toilet during and after each flushing of the toilet.

A water level sensor can typically be arranged either on a wall of the tank 101 of the toilet 100, placed inside the water 102 of the tank 101 to float therein, or be part of the dosing device 200. The water level sensor is typically used to detect when the toilet is flushed and when the flushing operation is over once the tank 101 is filled with water 102.

An optical sensor can also advantageously be arranged anywhere on the outside of the toilet 100, especially on a surface that is exposed to light 11 that is cast for example by the light source 10 on the toilet 100. In the example represented on FIG. 3, the sensor 231 is arranged on the top of the lid 105 of the toilet 100. Upon raising the lid 105, the sensor receives a much smaller light intensity which is indicative of a person starting to use the toilet. Upon lowering of the lid 105, the sensor receives a bigger amount of light before the person switches off the light 11. This is an event hinting at the end of the interaction of the person with the toilet 100. Alternatively, the sensor may detect the shade of a person standing in front of the toilet, typically standing less than one meter from the toilet 100, in particular if the sensor is arranged elsewhere on the toilet 100 than the lid 105. Another way to use information from this optical sensor is to react to the switching off and on of the light source 10. Upon detecting that the light is switched on, the sensor 231 can send the information to the non-transitory control unit 201 to start dispensing a first chemical composition, to prepare the water in the tank for flushing. This prevents the water 102 from being constantly filled with a concentration of chemical compositions that could otherwise deposit on the walls of the tank 102. When the light is switched back off, the sensor can send the information to the non-transitory control unit 201 which generates an activation signal to dispense a third chemical composition, such as a fragrance for example or a descaling agent into the tank 101.

A biosensor can be arranged preferentially inside the tank 101 to detect biofilms or any other biological material forming in the stagnant water 102 between two flushing operations of the toilet. A biosensor can also be arranged under the seat 106, under the lid 105, on the bowl 108 or in the drain pipe 109 of the toilet 100.

The dosing system of the present disclosure can include one or more than one sensor as such described above. The non-transitory control unit 201 can receive the information from the sensors 203, 231-233 directly or receive the information measured by the sensors 203, 231-233 from an external device that processes these signals beforehand. The information measured by the sensors 203, 231-233 can for example first be transferred via a network to a cloud or server or a mobile device 300 to be analyzed. The analysis can for example be made by a user or automatically by a program. Information provided by the sensors 203, 231-233 can also be stored to create a database that will later be used to update usage profiles and create a history of the environment of the toilet 100, in order for example to provide longer term maintenance recommendations or to provide statistics on the usage of the toilet 100.

It is to be further noted that, although the dosing device 200 is represented on FIG. 1 as having three cavities 202, the number of cavities is not restricted. There can be as many cavities 202 as desired, and these cavities can take different forms, for example be in the form of replaceable cartridges, have flexible or rigid walls and come in different sizes.

Figure 4:
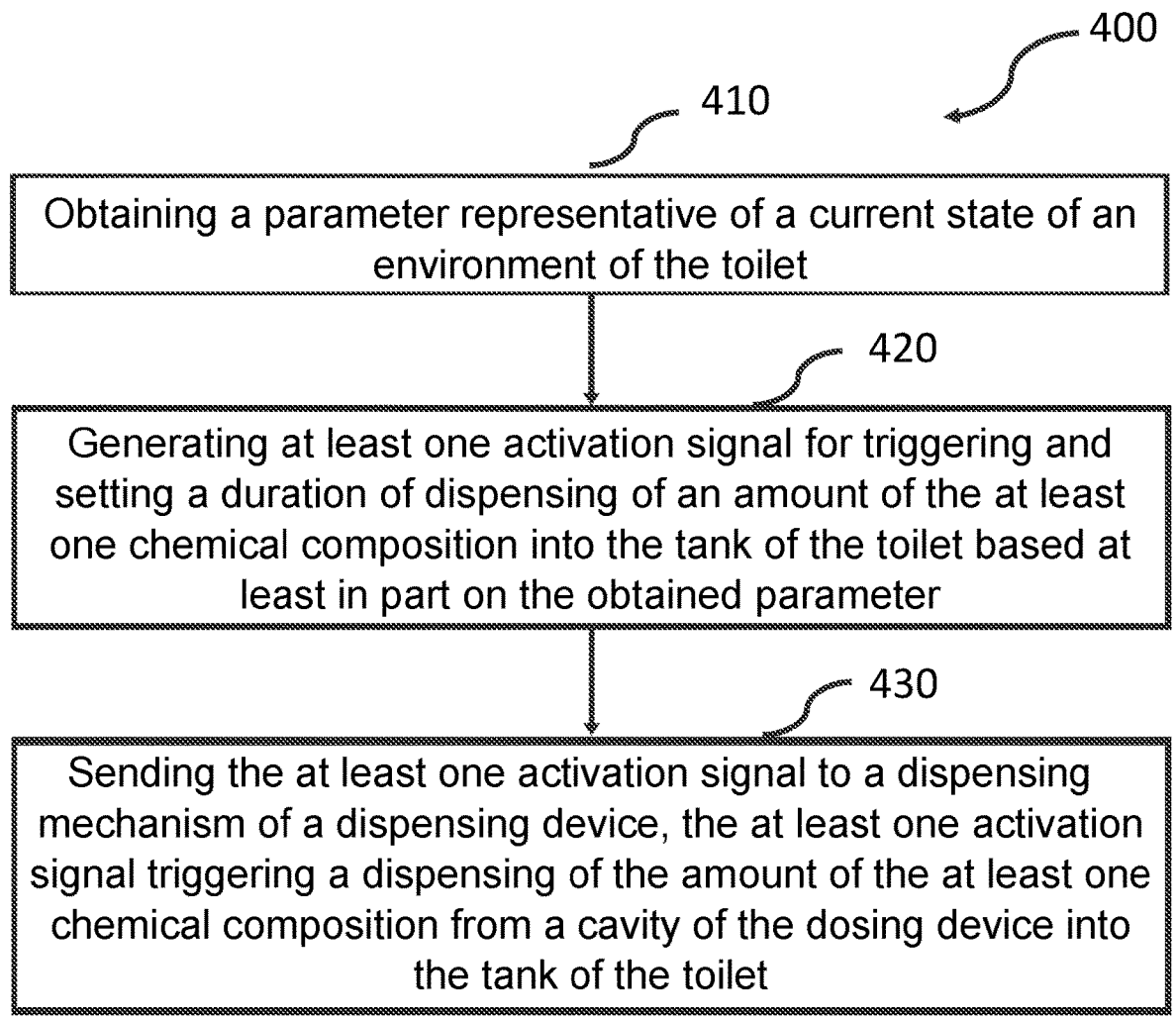
FIG. 4 shows a simplified workflow of a method according to an exemplary embodiment.

The present disclosure also relates to a method for dispensing at least one chemical composition into the tank 101 of a toilet 100. FIG. 4 is a flowchart illustrating the three main steps of such a method 400.

First the method includes a step of obtaining 410 a parameter representative of a current state of an environment of the toilet 100. The parameter can for example be one of: a vibration pattern associated with an interaction with the toilet, a noise pattern associated with an interaction with the toilet, presence of a molecule associated with an undesired scent, water hardness of water inside the tank of the toilet, intensity of light 11 cast on the toilet, mechanical pressure exerted on the toilet by a person sitting on the toilet, water level inside the tank of the toilet, presence of bacteriological material in water inside the tank of the toilet. The value of this parameter can be measured by one of the sensors 203, 231-233 described above.

Then the method includes a step of generating 420 at least one activation signal for triggering dispensing of an amount of the at least one chemical composition into the tank 101 of the toilet 100 based at least in part on the obtained parameter. The activation signal is generated by the non-transitory control unit 201 and is sent to the dispensing mechanism 204 of the dosing device 200 in order to control the opening and closing of the mechanism that dispenses the contents of a cavity 202 of the dosing device including the at least one chemical composition. The activation signal also defines the duration of the opening of the dispensing mechanism 204, thereby controlling the amount of the at least one chemical composition that is released into the tank 101. As explained above, the activation signal can be further generated based on information input for example by a user, for example via a mobile device 300 as represented schematically on FIG. 3. An external source of information, for example one provided by a user, can provide the non-transitory control unit 201 with a set of rules associating values of the parameter representative of the current state of the environment of the toilet 100 with properties of activation signals for triggering and setting the duration of dispensing of amounts of the at least one chemical composition into the tank 101 of the toilet 100.

The non-transitory control unit 201 may also receive form another source, a default operating program for generating activation signals for triggering dispensing of the chemical composition. In particular, this can include a regular activation regardless of the actual use of the toilet, for maintenance purposes or scent purposes. Such a program can be set and parameterized, for example via the mobile terminal 300.

Then, the method includes a step of sending 430 the at least one activation signal to a dispensing mechanism 204 of a dosing device 200, the at least one activation signal triggering a dispensing of the amount of the at least one chemical composition from a cavity 202 of the dosing device 200 into the tank 101 of the toilet 100. As explained above, the activation signal is parameterized so that the duration of the opening of the dispensing mechanism is adapted to release an amount of the at least one chemical composition that is correlated to the measured value of the parameter representative of the environment of the toilet 100. The dosing strategy can be further tuned using input from a user, in particular to adapt the dosing of certain chemical compositions that are best dispensed based on criteria set by the user (for example fragrances or colors).

The dispensing and dosing strategy can be further adapted to dispense different chemical compositions at different appropriate times into the tank 101 of the toilet 100. It is also possible to dispense one chemical composition several times for example before, during and after use of the toilet 100.

For example, a first chemical composition can be dispensed upon detecting a lifting-up of the lid 105 of the toilet 100, or upon detecting that a person has switched the light on in the room where the toilet is, or upon detecting the presence of a person within less than typically one meter from a toilet, or less than any other predetermined distance from the toilet representative of a person standing in front of the toilet. The first chemical composition can also be dispensed upon detecting an increase in pressure exerted on the seat 105 of the toilet 100, or by detecting a noise or vibration pattern characteristic of a person using the toilet.

A second chemical composition, which can for example be a different chemical composition than the first chemical composition, or be the same chemical composition, is typically dispensed upon detecting one of the following: a reduction of water level in the tank 101 of the toilet 100, an increase of water level in the tank 101 of the toilet 100, activation of a flushing mechanism of the toilet 100, a decrease in pressure exerted on a seat 106 of the toilet, indicative of a person standing up after sitting on the seat 106, a closing-down of a lid 105 of the toilet 100.

Upon detecting the activation of a flushing mechanism of a toilet, it is possible to distinguish between a short activation of the flushing mechanism, indicative of a short interaction with the toilet that does not require strong cleaning agents to be dispensed and long activation of the flushing mechanism, indicative of a more intensive use of the toilet that would typically require a bigger amount of cleaning agent to be dispensed or a stronger cleaning agent to be dispensed.

A third chemical composition can be dispensed at a later stage, for example upon detecting one of the following: an increase in light intensity cast on the toilet characteristic of a person moving away from the toilet, a decrease in light intensity cast on the toilet characteristic of a switching off of light in a room in which the toilet is, a noise characteristic of a door being opened and closed in a room in which the toilet is, a vibration characteristic of a door being opened and closed in a room in which the toilet is.

The first, second and third chemical composition can be different or identical. The third chemical composition is advantageously one that is meant to affect the water 102 in the tank 101 of the toilet 100 for the duration between two flushing operations. The chemical composition may in particular be a descaling agent, a biocide for example. The first chemical composition is advantageously one which is meant to act quickly during use of the toilet, and that is advantageously dispensed shortly before the flushing operation. This can include a cleaning agent, a coloring agent, a foaming agent. The second chemical composition is typically one that is dispensed during the flushing operation, such as a cleaning agent.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A dosing system for dispensing at least one chemical composition into a tank of a toilet, the dosing system comprising:
   at least one sensor configured to obtain a parameter representative of a current state of an environment of the toilet;
   a non-transitory control unit capable of receiving the measured parameter and configured to generate at least one activation signal for triggering dispensing of an amount of the at least one chemical composition into the tank of the toilet based at least in part on the parameter;

a dosing device configured to be inserted inside the tank of the toilet, the dosing device comprising:

at least one cavity containing the at least one chemical composition, a dispensing mechanism coupled with the at least one cavity, the dispensing mechanism being configured to receive the at least one activation signal from the non-transitory control unit and to dispense the amount of the at least one chemical composition into the tank of the toilet upon reception of the at least one activation signal, wherein the non-transitory control unit is configured to exchange data with a mobile device, data received from the mobile device providing the non-transitory control unit with a program comprising at least one activation signal for triggering and setting the duration of dispensing of the at least one chemical composition into the tank of the toilet.

2. The dosing system according to claim 1, wherein at least one of the non-transitory control unit and the at least one sensor is an integral part of the dosing device.

3. The dosing system according to claim 1, wherein the at least one sensor is at least one of:
a vibration sensor configured to identify vibration patterns associated with an interaction with the toilet,
an acoustic sensor configured to identify noise patterns associated with an interaction with the toilet,
a temperature sensor,
a chemical gas sensor configured to identify molecules associated with undesired scent,
a liquid turbidity sensor configured to measure properties of water inside the tank of the toilet,
a pressure sensor configured to detect usage of the toilet by a person sitting on a seat of the toilet,
a water level sensor configured to detect flushing of the toilet,
an optical sensor configured to detect changes in light intensity cast on the toilet characteristic of a person being present within a predetermined distance from the toilet, and
a biosensor configured to detect presence of biological material in water in the tank of the toilet.

4. The dosing system according to claim 1, wherein the parameter representative of a current state of an environment of the toilet is at least one of:
a vibration pattern associated with an interaction with the toilet;
a noise pattern associated with an interaction with the toilet;
presence of a molecule associated with an undesired scent;
water hardness of water inside the tank of the toilet;
intensity of light cast on the toilet;
mechanical pressure exerted on the toilet by a person sitting on the toilet,
water level inside the tank of the toilet; and
presence of bacteriological material in water inside the tank of the toilet.

5. The dosing system according to claim 1, wherein the at least one chemical composition is chosen from the group of:
a descaling agent;
an antibacterial agent;
a cleaning agent comprising enzymes;
a cleaning agent comprising surfactants;
a cleaning agent comprising polymers; a cleaning agent comprising a foam-forming substance;
a coloring agent; and
a fragrance.

6. The dosing system according to claim 1, wherein the dosing device comprises at least two cavities, each cavity being filled with a different chemical compound, each cavity being chosen from at least one among a refillable cartridge and a replaceable cartridge.

7. A dosing system for dispensing at least one chemical composition into a tank of a toilet, the dosing system comprising:
at least one sensor configured to obtain a parameter representative of a current state of an environment of the toilet;
a non-transitory control unit capable of receiving the measured parameter and configured to generate at least one activation signal for triggering dispensing of an amount of the at least one chemical composition into the tank of the toilet based at least in part on the parameter;
a dosing device configured to be inserted inside the tank of the toilet, the dosing device comprising:
at least one cavity containing the at least one chemical composition,
a dispensing mechanism coupled with the at least one cavity, the dispensing mechanism being configured to receive the at least one activation signal from the non-transitory control unit and to dispense the amount of the at least one chemical composition into the tank of the toilet upon reception of the at least one activation signal,
wherein the non-transitory control unit is configured to exchange data with a mobile device, data received from the mobile device providing the non-transitory control unit with a program comprising a set of rules associating values of the parameter representative of the current state of the environment of the toilet with properties of activation signals for triggering and setting the duration of dispensing of amounts of the at least one chemical composition into the tank of the toilet.

8. The dosing system according to claim 7, wherein at least one of the non-transitory control unit and the at least one sensor is an integral part of the dosing device.

9. The dosing system according to claim 7, wherein the at least one sensor is at least one of:
a vibration sensor configured to identify vibration patterns associated with an interaction with the toilet,
an acoustic sensor configured to identify noise patterns associated with an interaction with the toilet,
a temperature sensor,
a chemical gas sensor configured to identify molecules associated with undesired scent,
a liquid turbidity sensor configured to measure properties of water inside the tank of the toilet,
a pressure sensor configured to detect usage of the toilet by a person sitting on a seat of the toilet,
a water level sensor configured to detect flushing of the toilet,
an optical sensor configured to detect changes in light intensity cast on the toilet characteristic of a person being present within a predetermined distance from the toilet, and
a biosensor configured to detect presence of biological material in water in the tank of the toilet.

10. The dosing system according to claim 7, wherein the parameter representative of a current state of an environment of the toilet is at least one of:
- a vibration pattern associated with an interaction with the toilet;
- a noise pattern associated with an interaction with the toilet;
- presence of a molecule associated with an undesired scent;
- water hardness of water inside the tank of the toilet;
- intensity of light cast on the toilet;
- mechanical pressure exerted on the toilet by a person sitting on the toilet,
- water level inside the tank of the toilet; and
- presence of bacteriological material in water inside the tank of the toilet.

11. The dosing system according to claim 7, wherein the at least one chemical composition is chosen from the group of:
- a descaling agent;
- an antibacterial agent;
- a cleaning agent comprising enzymes;
- a cleaning agent comprising surfactants;
- a cleaning agent comprising polymers; a cleaning agent comprising a foam-forming substance;
- a coloring agent; and
- a fragrance.

12. The dosing system according to claim 7, wherein the dosing device comprises at least two cavities, each cavity being filled with a different chemical compound, each cavity being chosen from at least one among a refillable cartridge and a replaceable cartridge.

* * * * *